April 18, 1961 R. K. GALLOWAY 2,979,876

CARTON CLOSING MECHANISM

Original Filed April 30, 1956 9 Sheets-Sheet 1

INVENTOR
ROBERT K. GALLOWAY

BY Hans G. Hoffmeister

ATTORNEY

CARTON CLOSING MECHANISM

Original Filed April 30, 1956 9 Sheets-Sheet 2

INVENTOR
ROBERT K. GALLOWAY

BY Hans G. Hoffmeister
ATTORNEY

April 18, 1961 R. K. GALLOWAY 2,979,876

CARTON CLOSING MECHANISM

Original Filed April 30, 1956 9 Sheets-Sheet 3

INVENTOR
ROBERT K. GALLOWAY

BY Hans G. Hoffmeister

ATTORNEY

CARTON CLOSING MECHANISM

Original Filed April 30, 1956 9 Sheets-Sheet 4

INVENTOR
ROBERT K. GALLOWAY

BY Hans G. Hoffmeister
ATTORNEY

April 18, 1961 R. K. GALLOWAY 2,979,876

CARTON CLOSING MECHANISM

Original Filed April 30, 1956 9 Sheets-Sheet 5

INVENTOR
ROBERT K. GALLOWAY

BY Hans G. Hoffmeister.
ATTORNEY

CARTON CLOSING MECHANISM

Original Filed April 30, 1956 9 Sheets-Sheet 6

INVENTOR
ROBERT K. GALLOWAY

BY Hans G. Hoffmeister.
ATTORNEY

April 18, 1961 R. K. GALLOWAY 2,979,876

CARTON CLOSING MECHANISM

Original Filed April 30, 1956 9 Sheets-Sheet 7

INVENTOR
ROBERT K. GALLOWAY

BY Hans G. Hoffmeister
ATTORNEY

April 18, 1961 R. K. GALLOWAY 2,979,876

CARTON CLOSING MECHANISM

Original Filed April 30, 1956 9 Sheets-Sheet 8

INVENTOR
ROBERT K. GALLOWAY

BY Hans G. Hoffmeister
ATTORNEY

April 18, 1961 R. K. GALLOWAY 2,979,876

CARTON CLOSING MECHANISM

Original Filed April 30, 1956 9 Sheets-Sheet 9

INVENTOR
ROBERT K. GALLOWAY

BY Hans G. Hoffmeister
ATTORNEY

United States Patent Office 2,979,876

Patented Apr. 18, 1961

2,979,876

CARTON CLOSING MECHANISM

Robert K. Galloway, Hoopeston, Ill., assignor to Food Machinery and Chemical Corporation, San Jose, Calif., a corporation of Delaware Original application Apr. 30, 1956, Ser. No. 581,402, now Patent No. 2,906,392, dated Sept. 29, 1959. Divided and this application Aug. 27, 1958, Ser. No. 757,596

2 Claims. (Cl. 53—374)

This invention relates to packaging machines, and particularly to a machine for closing cartons after articles have been inserted therein.

This application is a division of my copending application Serial No. 581,402, entitled "Machine for Inserting Articles Into Cartons," filed April 30, 1956, now U.S. Patent No. 2,906,392.

An object of the instant invention is to provide a novel high speed machine for closing cartons.

Another object of the invention is to provide a novel efficient mechanism for folding and locking the end flaps of a carton after an article has been inserted thereinto.

Other objects and advantages will become apparent from the following description taken in conjunction with the accompanying drawings in which:

Fig. 9 is a schematic view illustrating the drive mechanisms for the two tucking cams.

Figure 1:
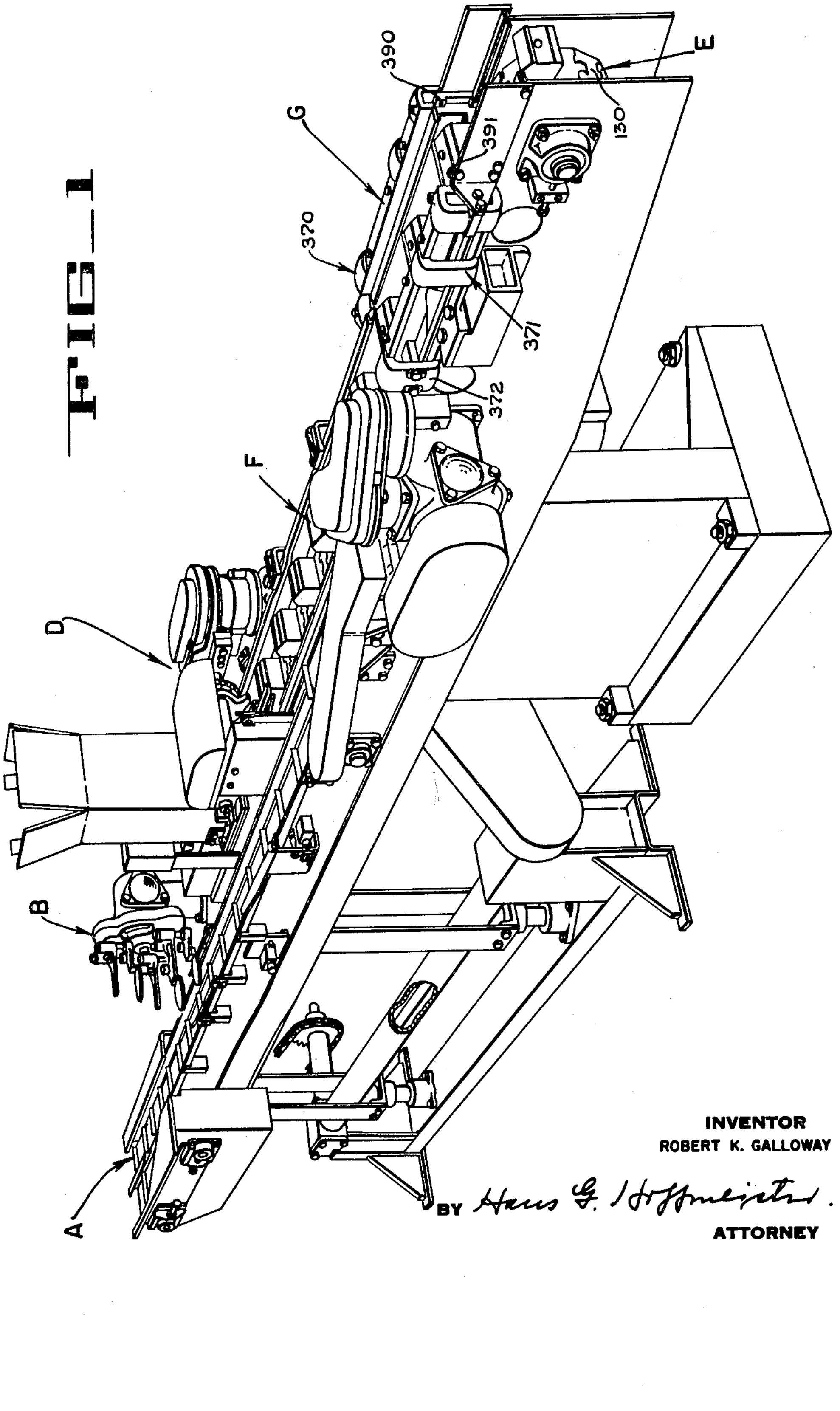
Fig. 1 is a perspective of a pie cartoning machine including the carton closing mechanism of the present invention, viewed from the discharge end thereof toward the receiving end, and showing the side of the machine which will be referred to as the right side.

Referring now to the drawings and particularly to Figs. 1, 2, 3A and 3B thereof, the carton closing mechanism of the present invention is there shown as a part of a pie packaging machine comprising a pie conveyor A adapted to receive pies from a pie making machine (not shown) and convey the pies past a pie tamping and perforating machine B to a pie inserting station F. A carton erecting mechanism D is adapted to erect cartons from a flat folded condition to an open and erect condition on a carton conveyor E, disposed parallel to and operating in timed relation with the pie conveyor A. At the pie inserting station F the pies are transferred from the pie conveyor A into the open cartons C on the carton conveyor E, and thereafter the carton conveyor E conducts the filled cartons C through the carton closing and locking mechanism G of the present invention.

Figure 3A:
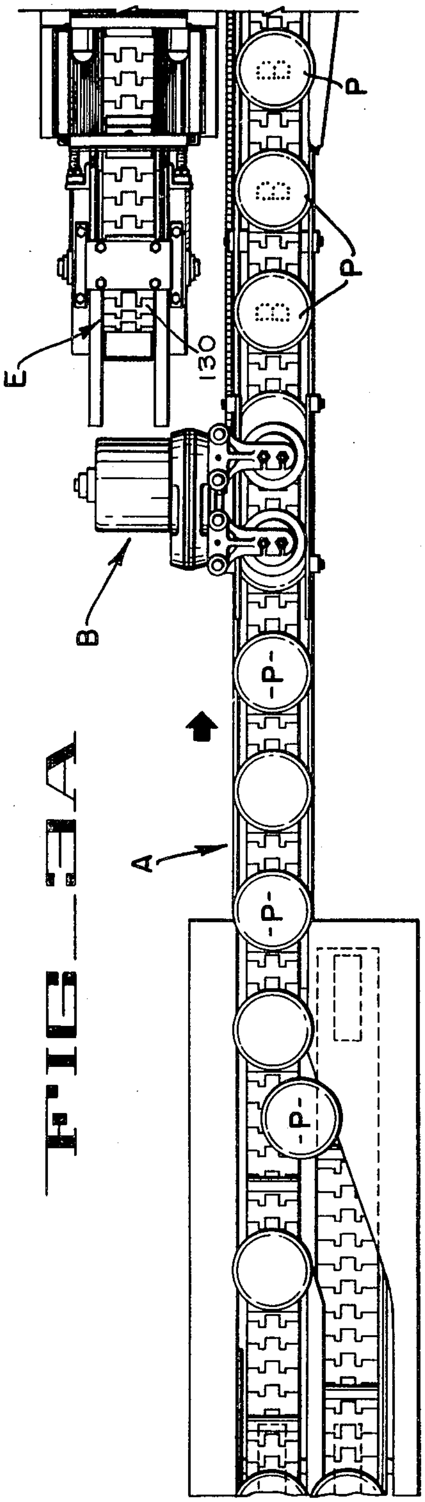
Figs. 3A and 3B are fragmentary plans which, when assembled end to end, together form a plan of the machine shown in Figs. 1 and 2.
Figure 3B:
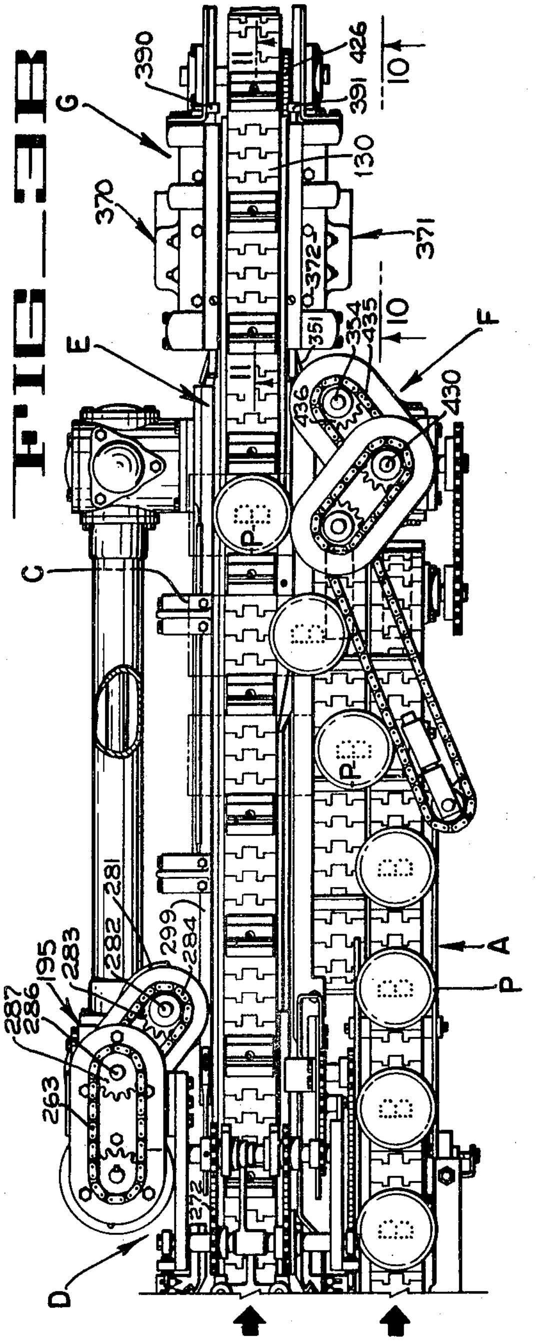
Figures 3, 4, 5:
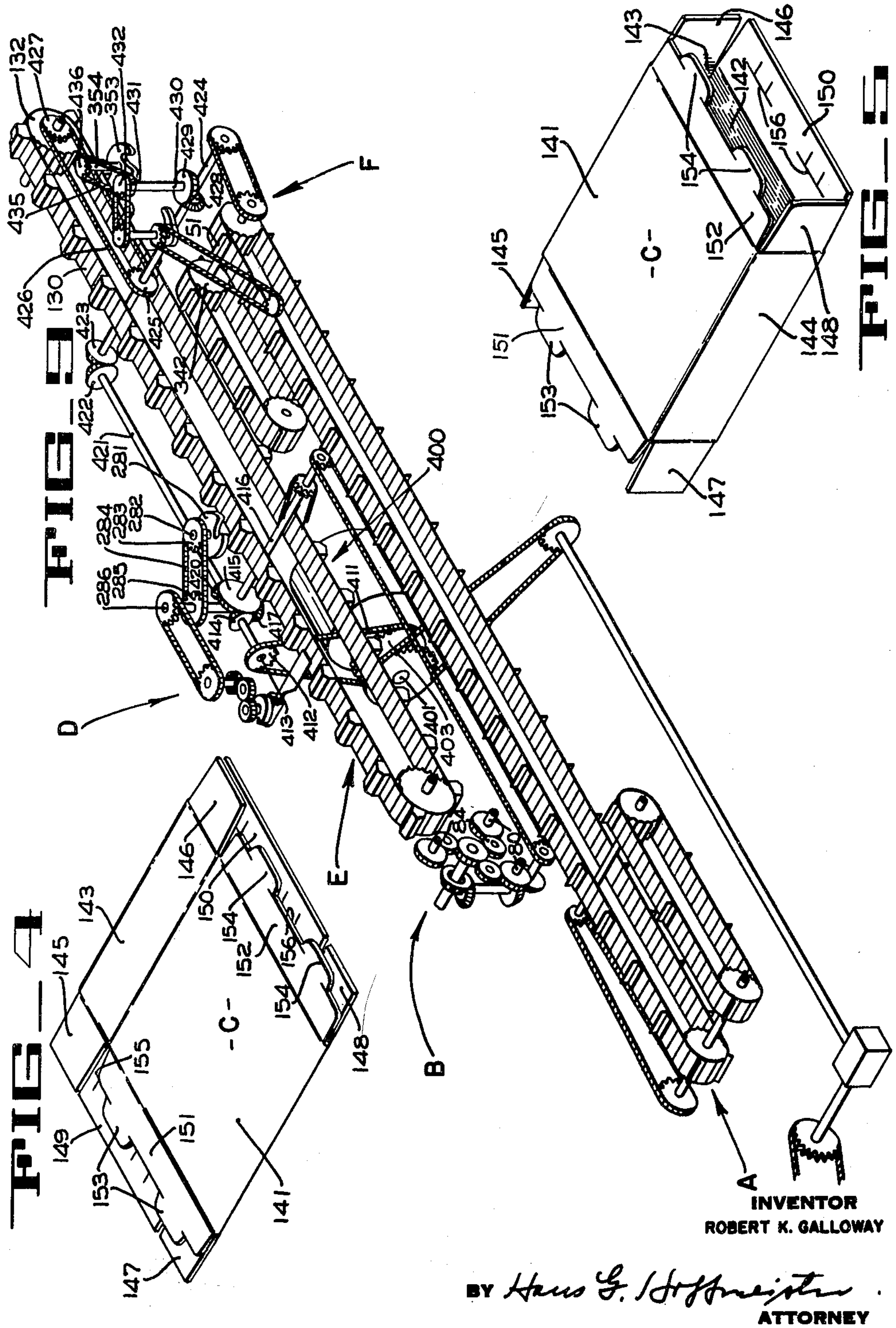
Figs. 4 and 5 are perspectives illustrating in collapsed and open positions, respectively, a carton of the type adapted to be handled by the closing machine of the invention.

A carton of the type adapted to be closed by the machine of the present invention is illustrated in Figs. 4 and 5. It comprises a top panel 141, a bottom panel 142, a front side panel 143, and a rear side panel 144. A pair of end flaps 145 and 146 extend laterally from the opposite side ends of the panel 143, and similarly, a pair of flaps 147 and 148 extend laterally from the side ends of the panel 144. Similarly, flaps 149 and 150 extend from the opposite ends of the bottom panel 142, and flaps 151 and 152 extend from the opposite ends of the top panel 141. The flaps 151 and 152 attached to the top panel 141 are shorter than the flaps 149 and 150 attached to the bottom panel 142 and the flaps 145, 146, 147 and 148 attached to the front and rear panels 143 and 144. Furthermore, the top panel flaps 151 and 152 are provided with outwardly projecting tabs 153 and 154, respectively, that are adapted to be received within suitable slits 155 and 156 correspondingly located in the flaps 149 and 150, respectively.

*Left side front and rear flap tucking mechanism*

Figure 6:
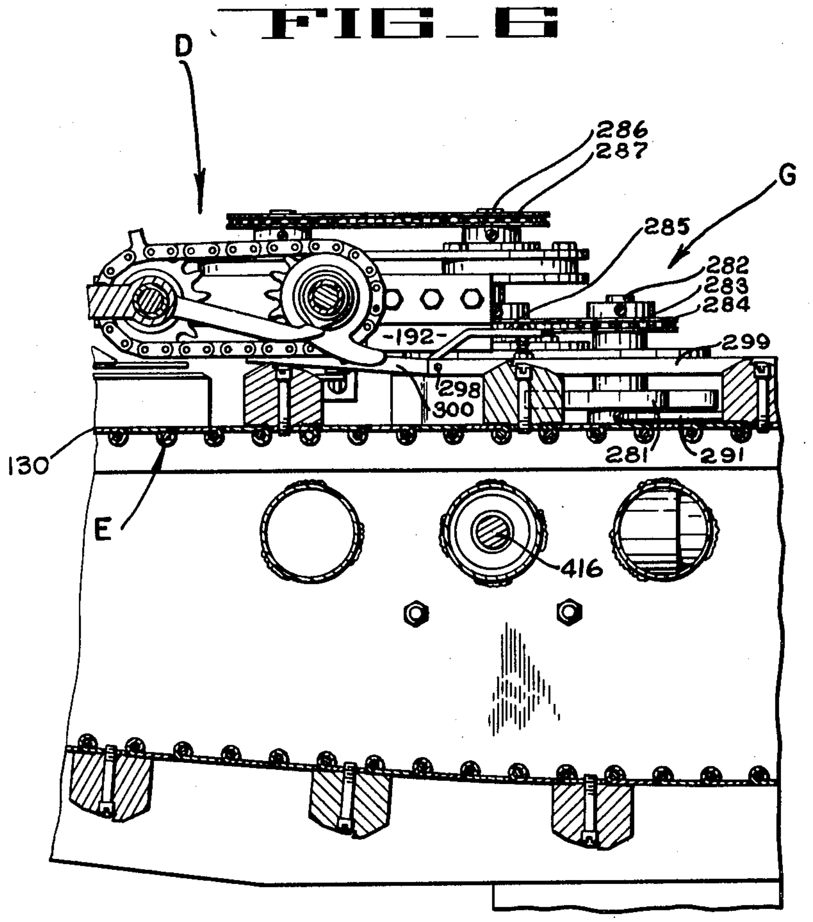
Fig. 6 is a fragmentary vertical section of the machine of Fig. 1, illustrating the left end flap-tucking cam of the present invention.
Figure 7:
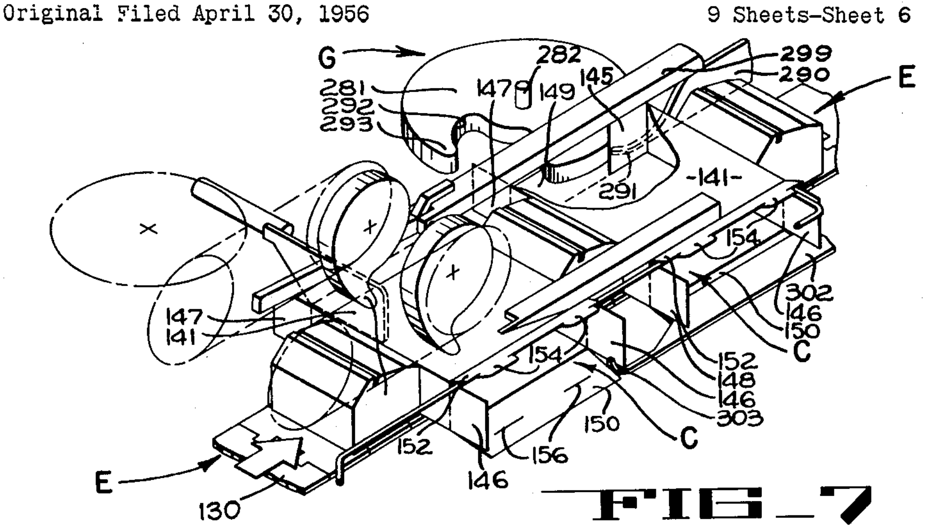
Fig. 7 is a fragmentary schematic perspective illustrating the tucking cam shown in Fig. 6.

As best seen in Figs. 6 and 7, a flap tucking disc cam 281 is fixed to a vertical shaft 282 rotatably supported by suitable bearings (not shown) adjacent the left side of the carton conveyor E, forwardly of the location of the erecting mechanism D. A drive sprocket 283 (Figs. 3B and 6) is fixed to the upper end of the shaft 282 and is connected by a drive chain 284 to a suitable sprocket 285 (Fig. 6) fixed to a vertically extending drive shaft 286. A cam guide plate 290 extends parallel with the left edge of the carton conveyor E and is provided with a rearwardly extending finger 291 which extends below the plane of the tucking cam 281 and is adapted to be struck by, and to fold inwardly, the flap 145 at the left end of the forward panel 143 of each carton C moved therepast by the carton conveyor E. The upper edge of the guide plate 290 is spaced from the lower surface of a guide bar 299 a distance sufficient to permit the flap 151 at the left end of the top panel 141 of the advancing carton C to extend therebetween.

The flap 147 at the left end of the rear panel 144 is received within an indentation 292 formed in the periphery of the tucking cam 281 and is, in turn, folded inwardly by a finger 293 defining one edge of the indentation 292, since the tucking cam 281 is rotated with a peripheral velocity greater than the velocity of the carton conveyor E. The diameter of the tucking cam 281 is so chosen, and the rotation of the cam 281 is so timed with relation to the movement of the conveyor E, that the flaps 147 connected to the left end of the rear panel 144 of each of the consecutive cartons, is received within the indentation 292 and folded inwardly by the finger 293 so as to be received adjacent the inner surface of the guide plate 290.

*Right side front and rear flap tucking mechanism*

Figure 8:
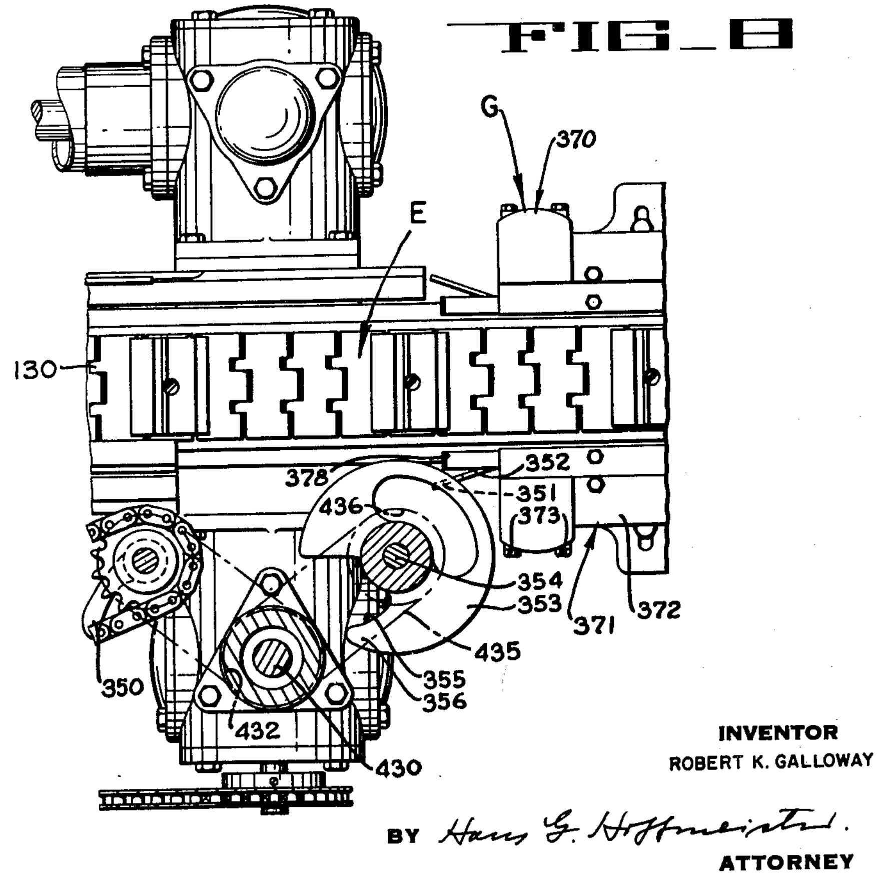
Fig. 8 is a fragmentary plan with certain portions removed to illustrate the right end flap-tucking cam.

The mechanism for tucking the front and rear end flaps 143 and 148, respectively, on the right end of each advancing carton comprises a rearwardly extending finger 351 (Figs. 3B, 8 and 10) on a vertical plate 352 of the carton closing and locking mechanism G which is adapted to be contacted by and to fold inwardly the flap 146 on the right end of the forward panel 143 of the carton C. A second flap tucking disc cam 353 similar to the cam 281, previously described, is fixed on a shaft 354 for rotation therewith at a position adjacent the forward end of the locking mechanism G. As can best be seen in Fig. 8, the tucking cam 353 is provided with an indentation 355 partly defined by a tucking finger 356 which contacts the flaps 148 on the rear panel 144 of the cartons C and tucks said flaps inwardly in the same manner as described above with respect to the flaps 147. The plate 352 with the flap folding finger 351, and the disc cam 353 having the flap folding finger 356 are located forwardly of the pie inserting station F and consequently operate upon each carton only after a pie has been placed therein.

The drive mechanism for the carton conveyor E and the trucking cams 281 and 353 described above is shown diagrammatically in Fig. 9. It comprises a motor and a variable ratio gear reducing unit 400 (Figs. 2 and 9) having an output shaft 401 to which there is affixed a drive sprocket 403. The sprocket 403 is connected by a chain 411 to a sprocket 412 on a line shaft 413. A bevel gear 414 fixed to the shaft 413 meshes with a bevel gear 415 on a transverse shaft 416 and a bevel gear 417 on the hereinabove mentioned vertical shaft 286, that drives the tucking cam 281.

A bevel gear 420 on one end of a line shaft 421 meshes with and is driven by the bevel gear 415. The line shaft 421 drives a transverse shaft 424 through intermeshed bevel gears 422 and 423, respectively. A sprocket 425 on the shaft 424 is connected by a chain 426 to a sprocket 427 fixed to a sprocket-like drum 132; and the carton conveyor E includes an endless belt 130 trained around the drum 132 and by which the cartons are propelled through the machine.

A bevel gear 428 on the shaft 424 drives a bevel gear 429 on a vertical drive shaft 430. A sprocket 431 is fixed to the upper end of the shaft 430. By means of a chain 435, the sprocket 431 drives a sprocket 436 fixed to the above mentioned shaft 354 of the right side flap tucking cam 353.

*Top and bottom flap closing mechanism*

Figure 2:
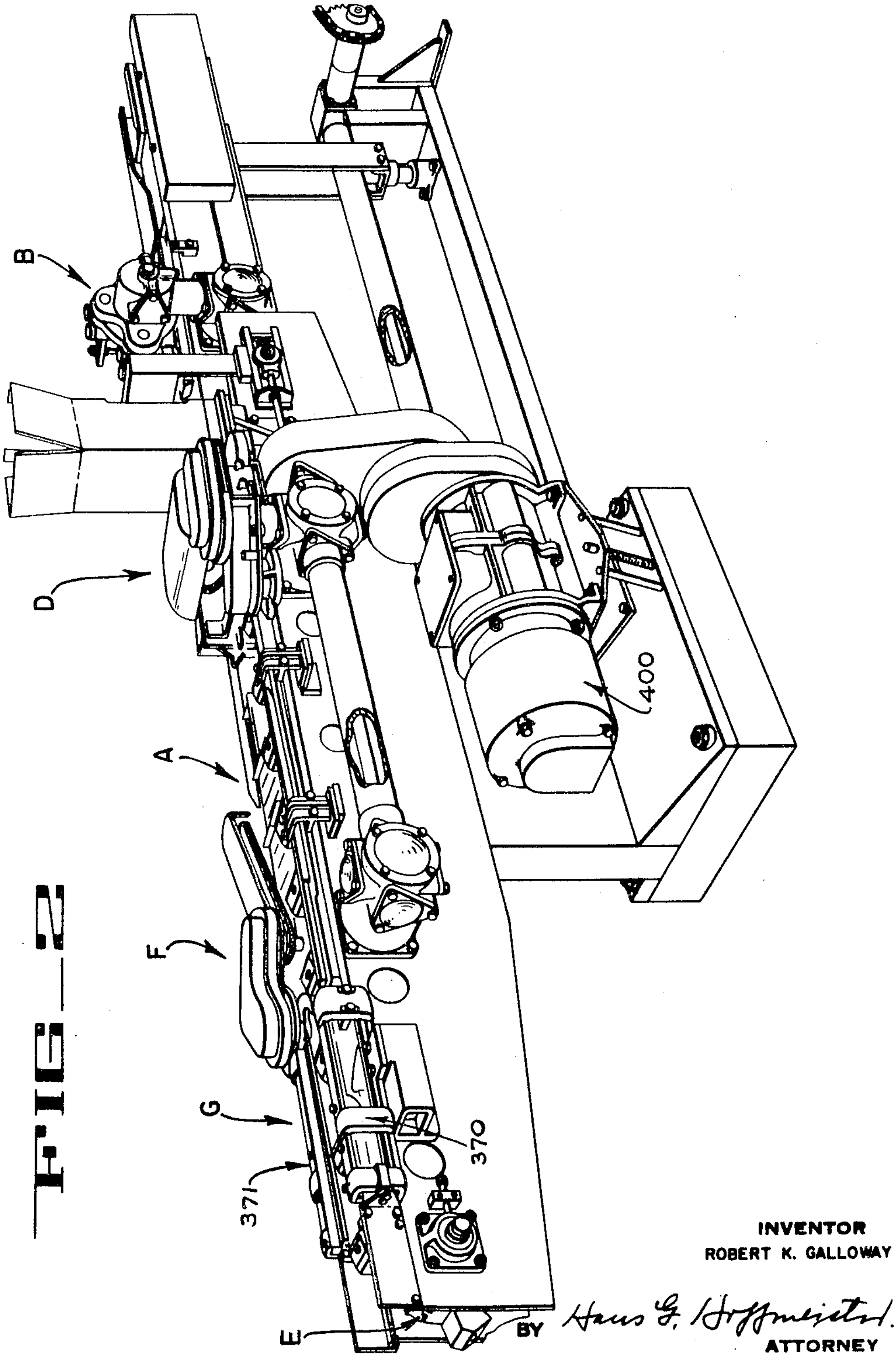
Fig. 2 is a similar perspective showing the left side of the machine of Fig. 1.

As shown in Figs. 1, 2, and 3B, the top and bottom flap closing and locking mechanism of the instant invention comprises two directly opposite flap closing assemblies 370 and 371, respectively, mounted adjacent the left and right sides, respectively, of the carton conveyor E. Since the two flap closing and locking mechanisms 370 and 371 are mirror images of each other, acting in exactly the same manner, but on opposite ends of each carton, only the mechanism 371 adjacent the right side of the carton conveyor E will be described in detail.

Referring now specifically to Figs. 10 and 12 through 17, the mechanism 371 comprises a U-shaped bracket 372 (best shown in Figs. 12 through 16) fixed to the frame of the machine with the open face thereof facing inwardly toward the center line of the conveyor E. The vertical plate 352 having the flap folding finger 351, previously described, is mounted on the bracket 372 by a pair of studs 373 in the manner indicated in Figs. 10 and 12. The plate 352 holds the front and rear end flaps 146 and 148 in their inwardly folded position and provides upper and lower edges about which the upper and lower flaps 152 and 150, respectively, can be folded. The plate 352 is beveled along its entire upper and lower edges as indicated at 374 and 375 to provide knife edges about which such folding is accomplished.

Figure 10:
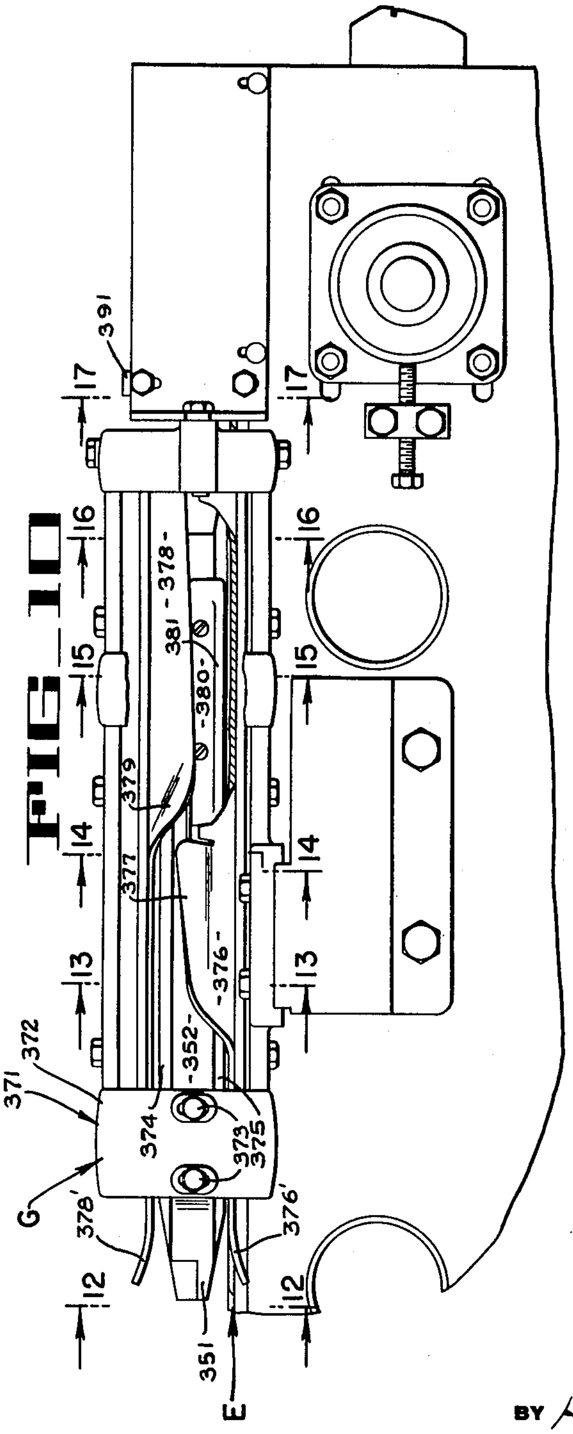
Fig. 10 is a side elevation, with parts broken away, of the end flap folding and locking mechanism, looking in the direction of the arrows 10—10 of Fig. 3B.
Figure 11:
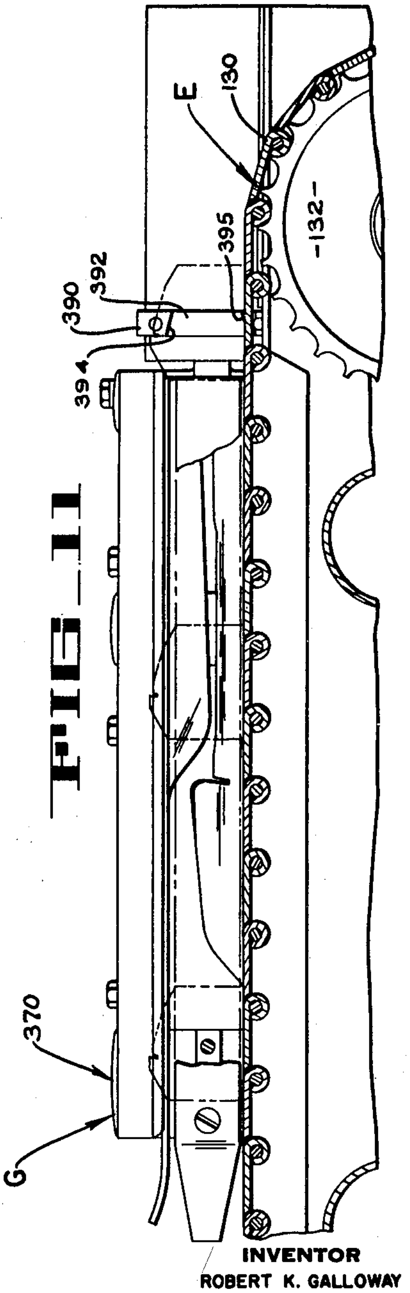
Fig. 11 is a central longitudinal section of the end flap folding and locking mechanism taken on line 11—11 of Fig. 3B.
Figure 12:
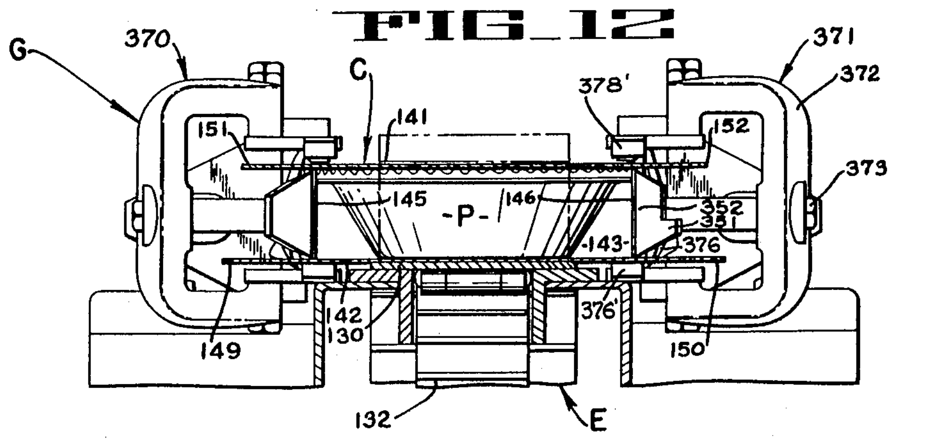
Figs. 12 to 17 are transverse vertical sections taken on lines 12—12 to 17—17, respectively, of Fig. 10 and showing a carton in successive phases of the closing operation.
Figure 13:
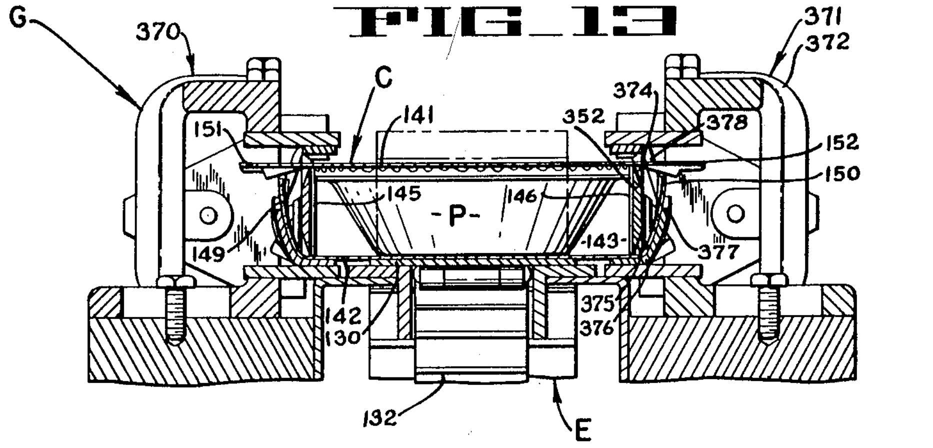
Figure 14:
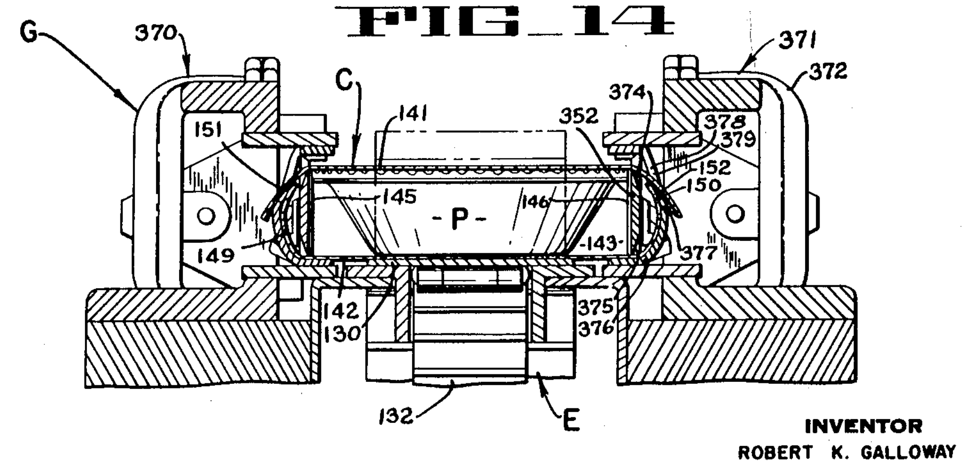
Figure 15:
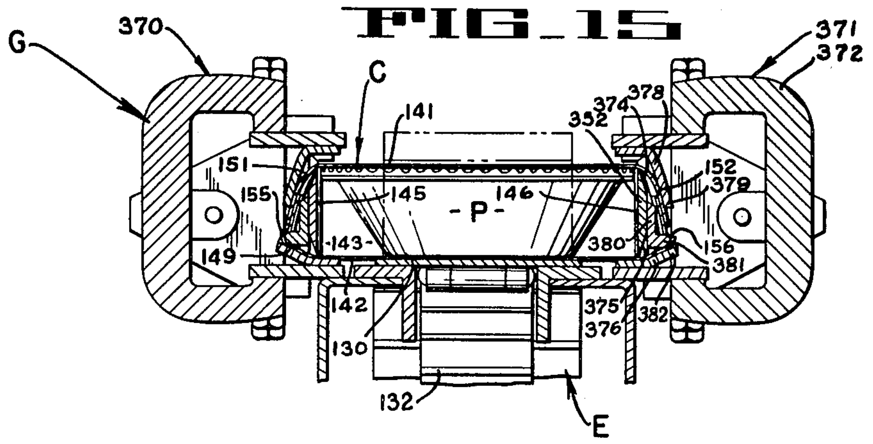
Figure 16:
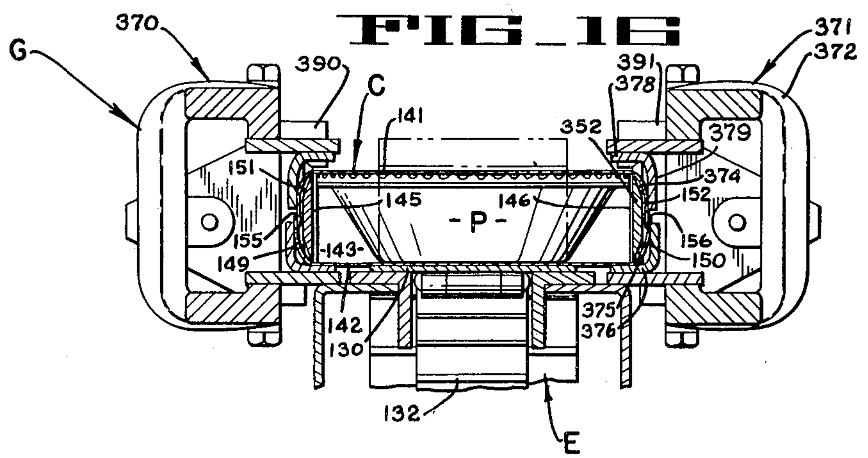
Figure 17:
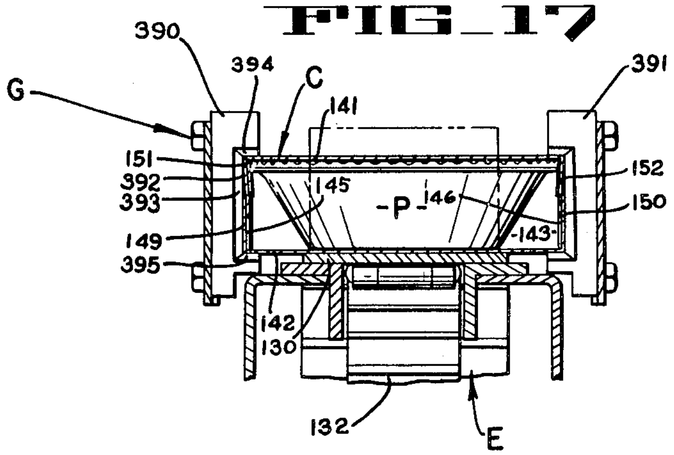

A bottom flap folding cam 376 (Figs. 10 and 12 through 16) is fixed to the bracket 372 and extends both forwardly and rearwardly therefrom. As best seen in Fig. 10, the folding cam 376 is initially merely a horizontal plate having a downwardly flared rearmost end 376' adjacent, but spaced rearwardly from, where it is attached to the lower leg of the bracket 372, but is provided with a folding wing 377 which is progressively bent from an initially substantially horizontal position at its rearmost edge to a substantially vertical position at its foremost edge, whereby the bottom flap 150 of each carton C is bent upwardly in the manner indicated in Figs. 13 and 14, as the carton C progresses past the plate 376.

An upper flap folding cam 378 having an upwardly flared rearmost end 378' (Figs. 10 and 12) is attached to the upper leg of the bracket 372 and extends forwardly therefrom. The plate 378 is provided with a folding wing 379, the rearmost edge of which is spaced forwardly of the foremost edge of the wing 377 on the plate 376. The wing 379 similarly progresses from a substantially horizontal position at its rearmost edge to a depending vertical position therebeyond, whereby as the carton progresses the upper flap 152 is bent downwardly to a position overlying the flap 150 in the manner illustrated in Fig. 14.

A plate 380 (Figs. 10 and 16) is fixed to the outer surface of the guide plate 352 and is provided with an outwardly projecting cam portion 381 at such a height that it is adapted to engage the bottom flap 150 of each carton adjacent to and immediately below the slits 156 formed in said flap 150. The bottom flap folding cam plate 376 is turned outwardly adjacent the cam projection 381 in the manner indicated at 382 in Fig. 15, whereby as the carton progresses past the cam projection 381, the upper portion of the bottom flap 150 is held inwardly by the overlapping flap 152 and the wing 379, while the lower portion is bowed outwardly in the area containing the slits 156 causing the slits to move downwardly below the lower ends of the tabs 154 and to snap open as the slits pass the lower edges of the tabs. The upper flap folding cam wing 379 maintains the upper flap 152 and the tabs 154 extending therefrom in close contact with the outer surface of the lower flap 150, whereby as the carton progresses beyond the end of the cam projection 381 and the flaps are returned to their planar position by the folding cams 378 and 376, the slits 156 move upwardly and the tabs 154 are projected through the slits 156 in the manner illustrated in Fig. 16.

It will be understood that the tabs 153 of the upper flap 151 at the left end of the carton are similarly inserted into the slits 155 in the lower flap 149 by the left hand flap closing mechanism 370. Both of these flap closing and interlocking operations occur simultaneously and upon completion thereof, the carton progresses beyond the foremost end of the plate 352 and between a pair of setting or crimping cam plates 390 and 391 which are mounted on the frame of the machine adjacent the left and right sides, respectively, of the carton conveyor E in the manner illustrated in Fig. 17. The cam plate 390 is provided with an inwardly facing U-shaped opening 392 of the exact size as the outside dimension of the left ends of the cartons C. The vertical edge portion of the opening 392 is tapered forwardly and inwardly in the manner indicated at 393, the upper edge portion is tapered forwardly and downwardly in the manner indicated at 394 and the bottom edge portion is tapered forwardly and upwardly in the manner indicated at 395, whereby, as the carton progresses through the opening 392, the end of the carton is squared and the flaps are folded firmly in the locked position with the fold lines of the flaps being sharply crimped.

It will be appreciated from an examination of Figs. 1, 3B, 10, 11, 12, and 17 that the squaring up operation thus described is duplicated on the right end of the carton C, and that the carton issues from the cam members 390 and 391 in its completely closed and locked condition with a pie P therewithin.

*Operation*

In the operation of the device, the erected cartons C are carried by the Carton conveyor E past the left front and rear flap tucking mechanism and the flaps 145 and 147 are folded inwardly thereby. After the articles have been inserted in the cartons C the cartons are then moved past the right side end flap tucking mechanism and the flaps 146 and 148 are folded inwardly thereby.

After the end flaps 145, 146, 147, and 148 have all been folded in, the conveyor E carries the cartons C between the opposed flap closing and locking mechanism G where the bottom flaps 149 and 150 are folded upwardly and the top flaps 151 and 152 are folded downwardly thereover and the tabs 153 and 154 are inserted through the slits 155 and 156, respectively, to securely interlock the upper and lower end flaps at both ends of the carton.

From the foregoing description it may be seen that the present invention defines a novel, efficient, high speed, automatic machine for closing and locking cartons.

While a preferred embodiment of the invention has been shown and described herein, it is to be understood that various changes may be made therein without departing from the spirit of the invention as defined in the appended claims.

Having thus described my invention, what I claim and desire to secure by Letters Patent is:

1. In a carton closing mechanism, a conveyor for conveying an erected carton along a predetermined path with the carton disposed transversely of the conveyor, said carton including flaps hingedly connected to the lower and upper panels of the carton, the flap of the lower panel having a horizontal slit therein and the flap of the upper panel having a tab adapted to enter the slit, folding means disposed adjacent said path for folding the end flaps, said folding means comprising an elongate vertical plate uniformly thin throughout its length and having upper and lower creasing edges, a lower cam plate having an upturned wing adjacent its rearmost edge adapted to fold the flap of said lower panel upward about the lower creasing edge of said plate to a position substantially normal to said lower panel, an upper cam having a downwardly turned wing at a point forwardly of said upwardly turned wing on said lower cam and adapted to fold the flap of said upper panel downward about the upper creasing edge of said plate to a position overlapping said flap of the lower panel and substantially normal to said upper panel, means on said upper cam forwardly of the downwardly turned wing thereon for retaining the upper portions of said flaps in said positions, cam means on said plate and projecting outward therefrom in position to engage said flap of the lower panel adjacent said slit for bowing the lower portions of said flaps outward to cause the slit on said lower flap to move downward beyond the lower end of said tab whereby said slit is caused to pop open as it passes the lower end of said tab, and means on said lower cam forwardly of said projecting cam means on said plate to move the lower portions of said flaps back to their positions normal to the upper and lower panels with said tab projecting through said slit.

2. In a carton closing mechanism, a conveyor for conveying an erected carton along a predetermined path with the carton disposed transversely of the conveyor, said carton including flaps hingedly connected to the lower and upper panels of the carton, the flap of the lower panel having a horizontal slit therein and the flap of the upper panel having a tab adapted to enter the slit, folding means disposed adjacent said path for holding the end flaps, said folding means comprising a vertical plate uniformly thin throughout its length and having parallel upper and lower edges, said edges being chamfered to provide creasing edges on said plate, a lower cam plate having an upturned wing adjacent its rearmost edge adapted to fold the flap of said lower panel upward about the lower creasing edge of said plate to a position substantially normal to said lower panel, an upper cam having a downwardly turned wing at a point forwardly of said upwardly turned wing on said lower cam and adapted to fold the flap of said upper panel downward about the upper creasing ege of said plate to a position overlapping said flap of the lower panel and substantially normal to said upper panel, means on said upper cam forwardly of the downwardly turned wing thereon for retaining the upper portions of said flaps in said positions, cam means on said plate and projecting outwardly therefrom for bowing the lower portions of said flaps outward to cause the slit in said lower flap to move downward beyond the lower end of said tab whereby said slit is caused to pop open as it passes the lower end of said tab, and means on said lower cam forwardly of said projecting cam means on said plate to move the lower portions of said flaps back to their positions normal to the upper and lower panels with said tab projecting through said slit.

References Cited in the file of this patent

UNITED STATES PATENTS

| | | |
|---|---|---|
| 1,693,172 | Bergstein | Nov. 27, 1928 |
| 1,956,531 | Jones | Apr. 24, 1934 |
| 2,698,559 | Harkess | Jan. 4, 1955 |
| 2,756,553 | Ferguson et al. | July 31, 1956 |
| 2,780,900 | Monroe et al. | Feb. 12, 1957 |